(12) United States Patent
Rushford

(10) Patent No.: US 6,936,182 B2
(45) Date of Patent: Aug. 30, 2005

(54) METHOD AND SYSTEM FOR OPTICAL FIGURING BY IMAGEWISE HEATING OF A SOLVENT

(75) Inventor: Michael C. Rushford, Livermore, CA (US)

(73) Assignee: The Regents of the University of California, Oakland, CA (US)

( * ) Notice: Subject to any disclaimer, the term of this patent is extended or adjusted under 35 U.S.C. 154(b) by 240 days.

(21) Appl. No.: 10/087,493

(22) Filed: Feb. 28, 2002

(65) Prior Publication Data

US 2003/0160025 A1 Aug. 28, 2003

(51) Int. Cl.[7] ............................. B44C 1/22; C03C 15/00; C03C 25/68; C23F 1/00
(52) U.S. Cl. ............................................ 216/85; 216/26
(58) Field of Search ............................. 216/24, 26, 31, 216/55, 85, 87, 94, 97, 65; 219/121.2, 121.19, 121.33, 121.35, 121.68, 121.69, 121.84, 628, 656, 635, 638, 660, 672; 359/648; 134/1, 105, 61, 88, 90, 84; 156/345.1, 345.11, 345.22, 345.24, 345.27

(56) References Cited

U.S. PATENT DOCUMENTS

| | | | |
|---|---|---|---|
| 4,343,116 A | 8/1982 | Murphy et al. | |
| 4,804,977 A | 2/1989 | Long | |
| 4,904,340 A | * 2/1990 | Miracky et al. | ............... 216/87 |
| 5,605,600 A | 2/1997 | Muller et al. | |
| 5,795,493 A | 8/1998 | Bukhman et al. | |

OTHER PUBLICATIONS

K. Daree & W. Kaiser, A Laser-induced gas etching technique, Glass Technology vol. 18 No. 1 Feb. 1977 pp. 19-20.
K. Daree & W. Kaiser, Optical surfaces figured by laser-controlled chemical reactions, Optics and Laser Tec. Apr. 1978 pp. 65-70.
F. A. Houl, Laser-Assisted Chemical Etching, SPIE vol. 459 Laser-Assisted Deposition, Etching, and Doping 1984 IBM Research Lab.

* cited by examiner

*Primary Examiner*—P. Hassanzadeh
*Assistant Examiner*—Roberts Culbert
(74) *Attorney, Agent, or Firm*—James S. Tak; Alan H. Thompson; Eddie E. Scott

(57) ABSTRACT

A method and system of imagewise etching the surface of a substrate, such as thin glass, in a parallel process. The substrate surface is placed in contact with an etchant solution which increases in etch rate with temperature. A local thermal gradient is then generated in each of a plurality of selected local regions of a boundary layer of the etchant solution to imagewise etch the substrate surface in a parallel process. In one embodiment, the local thermal gradient is a local heating gradient produced at selected addresses chosen from an indexed array of addresses. The activation of each of the selected addresses is independently controlled by a computer processor so as to imagewise etch the substrate surface at region-specific etch rates. Moreover, etching progress is preferably concurrently monitored in real time over the entire surface area by an interferometer so as to deterministically control the computer processor to imagewise figure the substrate surface where needed.

28 Claims, 4 Drawing Sheets

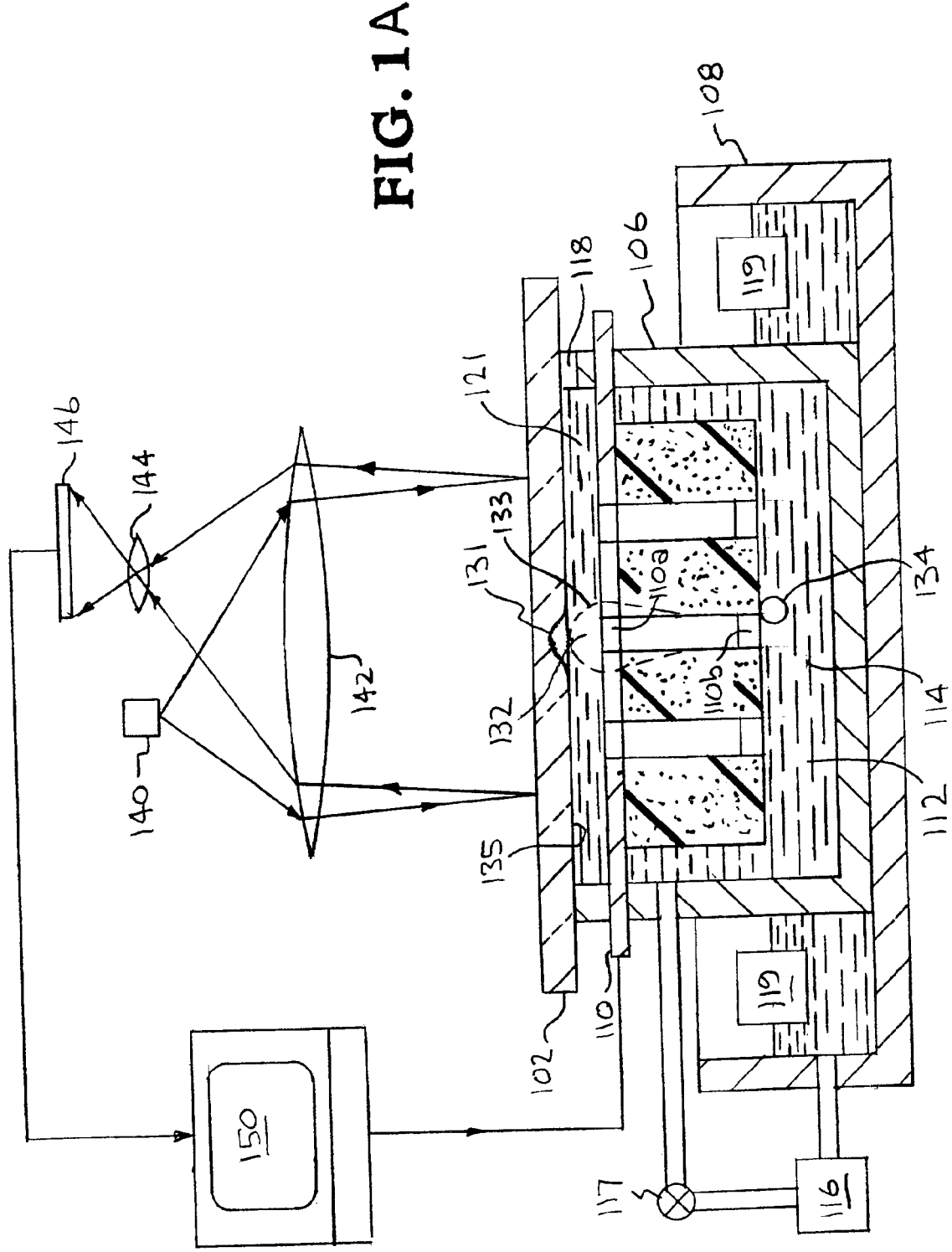

| 3C | 40C | 10C | 8C |
|---|---|---|---|
| 15C | 60C | 25C | 8C |
| 18C | 20C | 19C | 8C |
| 21C | 11C | 10C | 4C |

METHOD AND SYSTEM FOR OPTICAL FIGURING BY IMAGEWISE HEATING OF A SOLVENT

The United States Government has rights in this invention pursuant to Contract No. W-7405-ENG-48 between the United States Department of Energy and the University of California for the operation of Lawrence Livermore National Laboratory.

FIELD OF THE INVENTION

The present invention relates to modifying the surface of an object using dissolution chemistry. In particular, the present invention relates to a method and system of wet etching a substrate surface by independently controlling local thermal gradients in selected local regions of a boundary layer of an etchant solution, to imagewise etch the substrate surface at various region-specific etch rates in a parallel process.

BACKGROUND OF THE INVENTION

The shaping and finishing of glass or other materials is conventionally carried out by the operations referred to as grinding or diamond machining and subsequent polishing. It is often necessary, however, to flatten or reshape thin flat glass or other material of a thin, delicate construction. Figuring of glass thinner than 1 mm becomes impossible via grinding and traditional lap polishing as these processes scratch and break the glass under the typical applied forces of these techniques. The term "grinding" conventionally refers to the shaping of the glass surface by abrasives to a desired contour and polishing refers to the application of the finish to the surface. Polishing is usually effected mechanically, using a shaped tool known as a polishing lap. The polishing lap is normally rotated and works on the glass surface through the intermediary of inert fine solid particles suspended in a liquid supplied to the lap or to the glass surface so as to prevent direct contact between the lap and the glass surface.

Grinding and mechanical polishing are the operations which are conventionally used in converting glass articles into lenses for optical and ophthalmic purposes with a particular precise contour and polished finish. Thin delicate optics, however, are highly susceptible to breakage using such grinding and polishing methods.

SUMMARY OF THE INVENTION

Generally, the present invention provides a method and system of figuring a substrate surface, such as an optic surface, using dissolution chemistry in an imagewise etching process. The risk of breakage typically associated with grinding and polishing of optics can thereby be reduced if not eliminated. The dissolution chemistry utilized in the present invention is an etchant solution having etching properties which increase in etch rate with increasing temperature. These etching properties are controllably exploited by concurrently heating and/or cooling the etchant solution at various selected local regions of a boundary layer thereof to produce a cross-regional thermal profile effecting dissolution etching in a parallel process and at region-specific etch rates.

In one aspect of the present invention, a method is provided for figuring a substrate surface comprising the following steps: contacting a substrate surface with the etchant solution; and a local thermal gradient is then generated in each of a plurality of selected local regions of a boundary layer of the etchant solution to imagewise etch the substrate surface in a parallel process. Preferably, the local thermal gradients are generated by locally heating each selected local region of the boundary layer. In such a case, the etch rate of the etchant solution at the selected local regions is increased to imagewise etch the substrate surface in a parallel process. Preferably still, the step of locally heating each selected local region of the boundary layer is independently controlled so as to imagewise etch the substrate surface at region-specific etch rates.

In another aspect of the present invention a method is provided for figuring a substrate surface comprising the following steps: contacting the substrate surface with an etchant solution; activating a plurality of selected heaters corresponding to a plurality of selected local regions of a boundary layer of the etchant solution, and chosen from an indexed array of heaters each for locally heating a corresponding local region of the boundary layer upon selective activation thereof; and independently controlling, by a computer processor, the activation of each selected heater, to produce region-specific heating gradients in the selected local regions of the boundary layer and thereby imagewise etch the substrate surface at regions-specific etch rates in a parallel process.

A further aspect of the present invention is a method of figuring a substrate surface comprising the steps of: contacting the substrate surface with an etchant solution; projecting electromagnetic radiation towards selected local regions of a boundary layer of the etchant solution to locally heat the selected local regions; and independently controlling, by a computer processor, the electromagnetic radiation projected towards each selected local region, to produce region-specific heating gradients in the boundary layer and thereby imagewise etch the substrate surface at region-specific etch rates in a parallel process.

Another aspect of the present invention is a system for figuring a substrate surface comprising: means for generating a local thermal gradient in each of a plurality of selected local regions of a boundary layer of the etchant solution to imagewise etch the substrate surface in a parallel process.

A further aspect of the present invention is a system for figuring a substrate surface comprising: an indexed array of heaters each for locally heating a corresponding local region of a boundary layer of the etchant solution upon selective activation thereof, whereby activation of a plurality of selected heaters causes a plurality of selected local regions of the boundary layer to etch the substrate surface at greater etch rates than non-selected local regions; and a computer processor for independently controlling the activation of each selected heater, to produce region-specific heating gradients in the selected local regions of the boundary layer and thereby imagewise etch the substrate surface in a parallel process at region-specific etch rates.

And a still further aspect of the present invention is a system for figuring a substrate surface comprising: a projector for projecting electromagnetic radiation towards selected local regions of a boundary layer of the etchant solution to locally heat the selected local regions; and a computer processor for independently controlling the electromagnetic radiation projected towards each selected local region, to produce region-specific heating gradients in the boundary layer and thereby imagewise etch the substrate surface in a parallel process at region-specific etch rates.

BRIEF DESCRIPTION OF THE DRAWINGS

FIG. 1A is an elevation view of a first embodiment of an etching system and method having an indexed array of heating electrodes.

DETAILED DESCRIPTION OF THE INVENTION

Figures 1B, 1C:
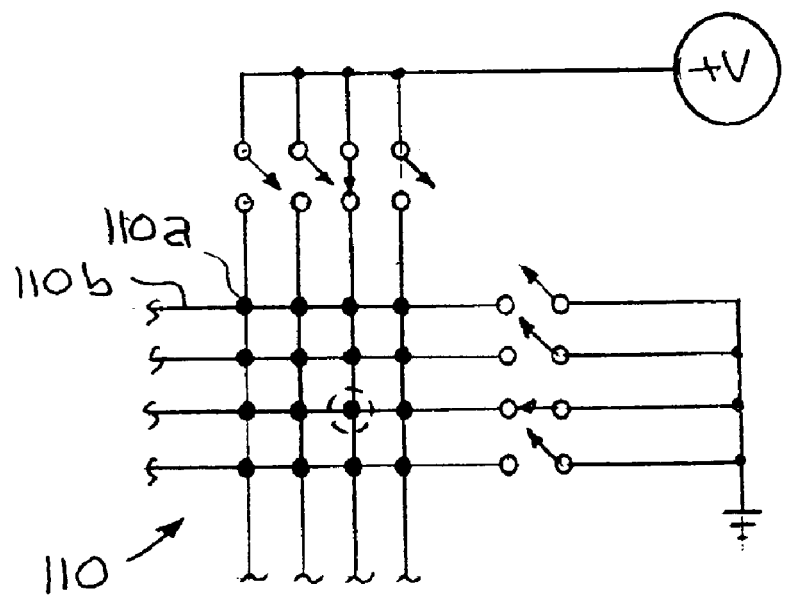
FIG. 1B is a schematic top view of the indexed array of heating electrodes.
FIG. 1C is a top view of an array of Thermal Electric Coolers and their temperatures during operation.

FIGS. 1–4 illustrate various embodiments of the present invention, each operating to wet etch a pattern on a substrate surface, e.g. a thin glass surface 110 in FIG. 1, in an imagewise manner using dissolution chemistry. Chemical dissolution etching will not scratch the substrate surface, nor will it apply an applied force on the surface typically associated with mechanical polishing. It is notable that the substrate utilized in the present invention can be any material composition amenable to chemical dissolution etching, with glass being one exemplary substrate material commonly used for optics applications, e.g. lens or mirrors. Moreover, "substrate" may include, inter alia, composites having multi-layered coatings or a laminated configuration, with the chemical etching applied on the surface of the top layer, coating, or laminate thereof. The following discussion examines the case of imagewise etching a thin optic (glass) sheet as a representative example.

Chemical dissolution is utilized via applied temperature change to the chemistry in contact with the substrate surface. Generally, heating or cooling (i.e. generating a heating or cooling gradient in) an etchant solution or solvent in contact with the substrate surface will respectively accelerate or decelerate the etch rate and dissolution of the substrate surface. For example, it is known that heating 1% hydrofluoric (HF) acid solution will approximately double the dissolution rate every ten degrees centigrade. Thus HF acid solution, hereinafter "acid," will be used in the present discussion as an exemplary etchant solution. It is appreciated, however, that other etchant solution formulations may be alternatively utilized whose substrate dissolution rates can be thermally controlled. It is also notable that the local heating or cooling preferably takes place in a narrow boundary layer of the acid, such as 121 in FIG. 1. The boundary layer is defined as a thin layer of acid adjacent and contacting the substrate surface. Typical thickness ranges can be from 0.01 to about 10 mm depending on the type of optic to be fabricated and the degree of lateral diffusion desired or tolerated. For such applications as the fabrication of continuous phase plates (CPP), the thickness of the boundary layer is suitably thin so as to more efficiently transfer heat through the boundary layer without appreciable lateral diffusion therein. However, greater lateral diffusions are desirable to flatten the ripples left in commercial glass.

Additionally, a pattern may be realized on a substrate surface by locally heating or cooling a plurality of selected local regions of the boundary layer corresponding to local target regions of the substrate surface. The local heating or cooling is carried out in an "imagewise" manner consistent with the surface profile modification required on the substrate surface. It is appreciated that the term "imagewise" describes a parallel process where etching takes place concurrently or simultaneously at a plurality of local target regions of the substrate surface, similar to the use of a branding iron. This imagewise wet etching process may thus be used to make continuously and complexly varying topographic profiles across the substrate surface. Such a process can provide substantial time saving over current small tool finishing process technology, which is typically serial in nature due to the small areas involved.

It is appreciated that a positive pattern or a reverse pattern may be imagewise etched on the substrate surface depending on the choice of locally heating or locally cooling the selected local regions of the boundary layer. In particular, a positive pattern (such as 31 in FIG. 1) is realized at a target region of a substrate surface by locally heating a selected local region (such as 132 in FIG. 1) corresponding to the target region. The increased temperatures operate to increase the local etch rate of each selected local region relative to the non-selected local regions. Similarly, a reverse etch pattern (not shown) may be realized at non-targeted regions of the substrate surface by cooling and thereby decelerating the etch rate of a selected local region of the boundary layer corresponding to a target region. In the case of locally cooling, it is assumed that the acid is characterized by a base etch rate, such as by macro-heating the entirety of the acid. It is appreciated in the general case, therefore, that a local dissolution etch rate is adjusted accordingly by generating a local thermal gradient, i.e. a local heating gradient or a local cooling gradient, in a selected local region of the boundary layer. This produces a cross-regional thermal contrast in the boundary layer to thereby imagewise etch the substrate surface in a parallel process at region-specific etch rates. While the following discussion examines the representative case of locally heating the etchant solution to positively etch a pattern on the substrate surface it is understood that the present invention is not limited only to such configuration and operation.

Various heating and/or cooling means may be utilized to effect the local heating and/or cooling of each of the selected local regions of the boundary layer. Examples of means for generating a local thermal gradient include, but are not limited to, electrical devices such as thermal electric coolers (TECs) for resistive heating and cooling, heat guns, hot and cold air blowers, lasers, infra-red lamps, and other electromagnetic radiation means in general. In particular, FIG. 1C shows a thermal electric cooler (TEC) device having heating/cooling electrodes and their current temperatures. A TEC array may have greater than approximately 200 by 200 electrodes depending on the application. Each of the heaters and coolers in the TEC array, each at a different polarity and power, may paint a thermal image into the HF acid etchant to produce a continuously contoured glass thickness. It is notable that the heat delivery method is preferably by specific heat density and conduction (such as in a branding iron), or by an optical projector like means such as lasers and infra-red lamps. In either case, a cross-regional thermal contrast is produced in the boundary layer of the acid to effect the imagewise etching in a parallel process.

Turning now to the drawings, FIG. 1A shows an elevation view of a first preferred embodiment of the method and system of the present invention. A container 106 is provided containing an acid bath 114 and having a configuration which enables placement of a substrate, such as glass 102, to contact the acid bath 114. In particular, the container 106 has an open upper end 120 over which the glass 102 is positioned to contact the acid bath 114. The glass 102 has a thin sheet construction with a thickness typically in the range of approximately 50–300 microns. When placed in this manner, contact between an etch surface 135 of the glass 102 and the acid bath 114 occurs at the boundary layer 121 of the acid 114.

As shown in FIGS. 1A–B, the heat source 110 is preferably a two-dimensionally indexed array of heaters 110, with each heater preferably comprising a pair of electrodes (e.g. 110a and 110b) for resistively heating a corresponding selected local region (e.g. 132) of the boundary layer 121. It is appreciated, however, that each heater may be configured in a variety of ways to generate heat, and is not limited only to use of electrodes. In any case, a top view of the indexed array 110 is illustrated in FIG. 1B showing the indexed array 110 arranged in an exemplary Cartesian grid formation with heating electrodes, such as 110a and 110b, located at each junction of the grid. Each junction of the grid defines a unique address/identifier corresponding to a unique point or local region of the boundary layer 121. And each heater's location in the array 110 is indexed i.e. its position is recorded and known, for subsequent calling or referencing. The indexed array of heaters 110 may be indexed by scanning the address of a heater into a controller, e.g. storing into memory of a computer processor 150. The heaters in the array 110 may also be addressed by a sparse non-interfering arrangement (i.e., diagonal clusters). Furthermore, the indexed array 110 is positioned sufficiently close to the glass surface 135, such that the etchant solution thickness therebetween forms the boundary layer 121. The boundary layer 121 is thus defined between the heat source, e.g. the indexed array 110, and the glass surface 135.

Operation of the indexed array of heaters 110 is also shown in FIGS. 1A–B. FIG. 1B in particular illustrates the switching configuration provided for selectively activating a plurality of heaters from among the indexed array of heaters 110. Each of the heaters, i.e. electrode pairs, may be turned on and off, to produce a local heating gradient at a corresponding selected local region of the boundary layer 121. In particular, briefly turning on a selected heater creates a heat pulse which acts locally till it again reaches the temperature of its neighbors. Repeated selective activation or addressing of each heater will maintain its heat "brightness" thus allowing for greater etching of the glass 102. It is appreciated that activation of the heaters includes controlling the duration and frequency of the activation, as well as the heat intensity per activation. Preferably, these parameters and the general selective activation of a heater are independently controlled by a computer processor 150 to wet etch the glass surface 135 as determined necessary at each local region thereof. By independently controlling each address of the indexed array of heaters 110, region-specific local heating gradients may be produced in the boundary layer 121 for imagewise etching the substrate surface at region-specific etch rates. And in this manner, the rippled surfaces of glass 102 may be made tenth wave ($\lambda/10$ or 100-nm) (optical path difference, "OPD") flatness or less by heating the acid at the OPD thicker parts of the glass 102.

In FIG. 1A, glass thickness measuring interferometry is additionally used in conjunction with the computer processor 150 to monitor the figuring of the glass 102 in real time. In particular, the interferometer system may be used to control the heating temperatures of the indexed array of heating electrodes 110 and thus control the region-specific etch rates. Because thin glass, even when wetted on one surface, can reflect light from each surface it is possible to make interferometer measurements of the relative distance of the surfaces from one another. As can be seen in FIG. 1A, a source of light 140 projects light through a first lens 142 and to the glass 102. This illuminates the glass 102 with a collimated beam. A reflection from the glass 102 travels through the first lens 142 and to a second lens 144. The image of the glass 102 may be recorded on a charge coupled device (CCD) 146 connected to the computer processor 150. The interference pattern between the light reflected from the top and bottom of the glass 102 is converted to a glass relative thickness map by the computer processor 150. In particular, at least four images of the glass 102 may be recorded at different wavelengths or illumination angles so as to enable a phase stepping measurement. Phase stepping the fringes can be done by angle of incidence of the light source and reflection angle into the CCD camera or wavelength changes in the source alone for any give incident and reflected angle. There is less wavelength shifting required and less angle shifting (or stepping) required, the thicker the glass 102 becomes. The images are used to calculate the fringe phase map and scaled and unwrapped to create a glass relative thickness map. Subsequently, the computer processor 150 selectively activates heaters from the indexed array 110 as determined necessary based on the glass relative thickness map. In this manner, the acid temperature may be controlled throughout the boundary layer 121 to dissolve the glass 102 at its thicker parts. The common path nature of optical path in this interferometer measurement for a glass sheet makes these interference fringes positions very robust to environmental disturbances.

In operation, resistively heated HF acid rises in the acid container 108 toward the glass 102. It is preferable, therefore, that the heating of each selected local region of the boundary layer 121 occurs from below the glass surface 135, as shown in FIG. 1A. Additionally, a heating system, depending on how it is applied, can invoke other phenomena like charge migration in the solution to imagewise etch a glass surface. In particular, the use of electrodes 110a and 110b in an acid solution, such as 1% HF solution, produces an ion concentration gradient which may also be used to etch the glass surface 135. As shown in FIG. 1A, the upper electrode 110a is made positive to attract F-ions 133 to the exemplary selected local region 132 of the boundary layer 121 of the acid bath. The increased acid temperature and increased F-ion concentration will together impart a surface profile change for the glass 102 that is in contact with this imagewise heated and ionic concentrated acid profile. Reference numeral 131 indicates a shaped profile, which is being etched into the glass 102. Hydrogen ($H_2$) gas bubbles will form at the negative potential side of the electrodes 110b (due to the charge migration of Hydrogen ions ($H^+$)) and are prevented from rising to the glass 102 by the sponge 112 as shown by reference numeral 134. The electrodes 110a and 110b may be positioned within the sponge 112 as shown in FIG. 1A, or outside the sponge. These bubbles are purged periodically as required. (In alternative embodiments, it would be possible to remove these bubbles with added chemistries and choice of the electrode 110a material).

As shown in FIG. 1A, an acid reservoir 108 includes ice 119 or some other means for macro-cooling the HF acid 114. A pump 116 and valve 117 are connected between the acid container 106 and the acid reservoir 108 to maintain a constant supply of cold HF acid 114 in the acid container 106. An overflow drain 118 maintains equilibrium in the fluid level in the acid container 106 and acts as bubble and excess liquid drain. Macro-cooling the HF acid 114 and the glass surface 135 not being heated allows for more contrast over the thermal differential, the etching rate and the resulting image in the glass 102 by limiting the effects of lateral dispersion. Additionally, the HF thickness or, alternatively, the presence of a porous medium such as sponge 112 may limit the lateral diffusion in the HF. Thermal distortions induced by heating the glass 102 may cause thickness changes but this much smaller than the profile being removed or added to the glass 102. It is appreciated that the acid concentration will set a base etch rate, which can approach zero for a bath temperature nearly freezing. Thus, macro-cooling the acid bath 114 can set a "null etch rate" whereby the glass surface 135 is not etched prior to local heating.

Figure 2:
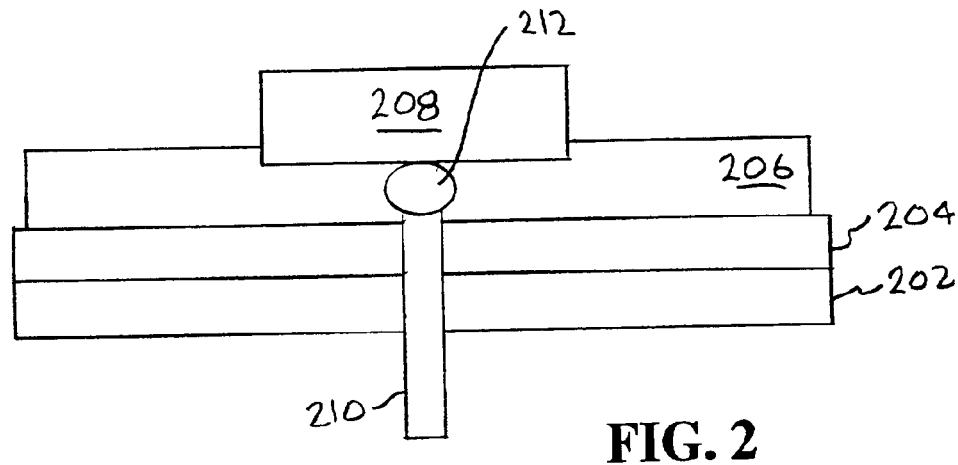
FIG. 2 is an elevation view of a second embodiment of the etching system and method illustrating the local heating of a representative selected local region of the etchant solution.

FIG. 2 is an elevation view of a second embodiment of the etching system and method utilizing electromagnetic radiation generally to locally heat selected local regions of the boundary layer of the acid in a parallel process. FIG. 2 shows a black acid-soaked porous medium (e.g., sponge) 208 in contact (floating) within an acid solution 206 at nearly ice water temperature. A black porous medium has absorption higher than most clear glasses and the aqueous acid. Thus visible light addressed heating of the water-acid soaked sponge is a possible means to modify the local aqueous acid etch rate. Projecting the electromagnetic radiation, e.g. laser 210, to generate heat on a small spot on a black sponge floating in acid above the glass generates a local heating gradient in a selected local region 212 of the boundary layer 206 between the glass 204 and the sponge 208. In this manner, a Gaussian shaped acid etch profile is delivered to the glass 704. Ice water temperature of the glass 704 insures that no appreciable acid etching compared to regions where heating is applied. It is possible to heat an approximately 10 to 100 micron thickness with a 10 micron spot of light with 100 milliwatts (mw) by 60 Centigrade in less than 100 milliseconds (ms). This heated volume will diffuse and cool leaving behind a Gaussian etching profile in the glass 704. The 60-degree temperature differential offers approximately ten times variation in etching rates for temperatures above 20 degrees. Cooling to near freezing offers even greater differential etch rates. The etching rate may substantially equal 7.5 nanometers/minute/degrees centigrade minus 75 nm/min/degree centigrade for 2% buffered HF. It is notable that while FIG. 2 shows a single representative electromagnetic radiation projected towards the boundary layer 206, the black sponge 208 is preferably imagewise irradiated in a parallel process. This can be by simultaneously projecting a plurality of beams, or addressing the selected local regions similar to that of a CRT electron beam. In the latter case, a heat pulse is created in the selected local region which acts locally until it again reaches the temperature of its neighbors. It is appreciated that imagewise etching in a parallel process is possible due to the high scan rate of irradiating the selected local regions compared to the etch duration caused by each heat pulse.

Figure 3:
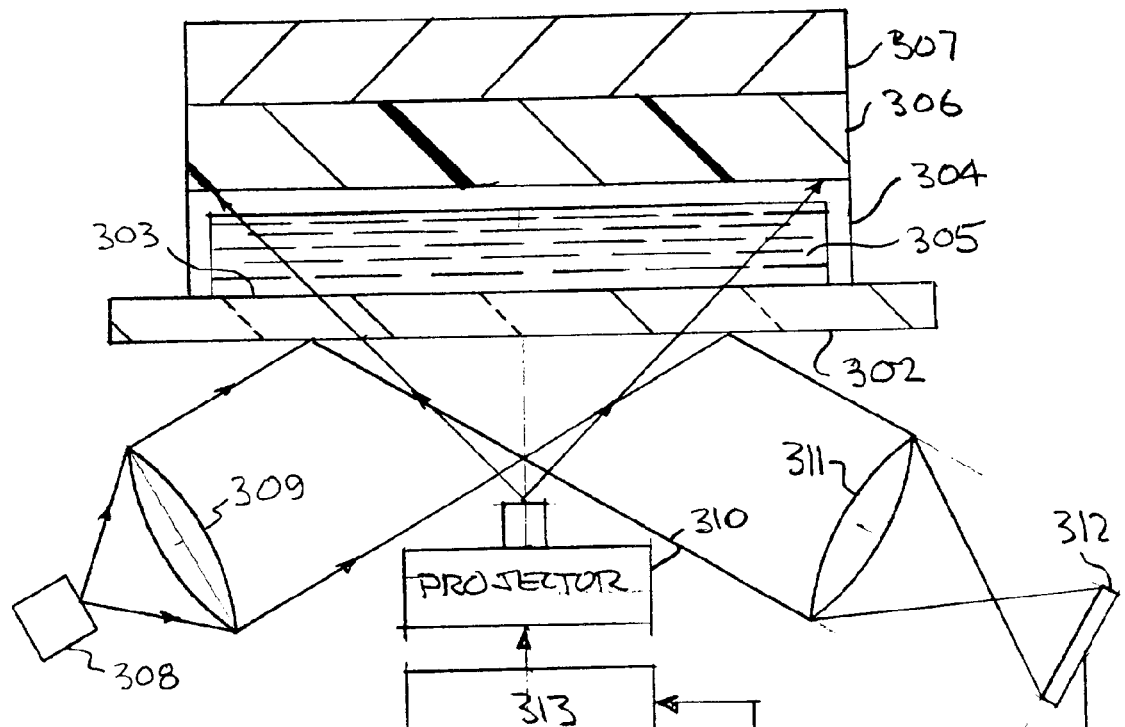
FIG. 3 is an elevation view of a third embodiment of the etching system and method.

FIG. 3 is an elevation view of a third embodiment of the etching system and method utilizing a projector (any electromagnetic means of imaging and thus heating) 310 to imagewise etch a substrate surface 303. A glass 302 is spaced against a thin film 304, i.e. boundary layer, of HF acid etchant. The acid and container 304 is in contact with a material 306 of graphite or black (e.g., delrin) which is in contact with a heat sink 308. In operation, the projector 310 images a heating profile onto the glass 302 against the black material 306. The imagewise heated material 306 will locally heat the boundary layer 304 of the HF acid etchant so as to resurface the glass 302 to a different glass thickness. As discussed above, the lateral diffusion in the HF may be limited by the HF thickness or by a porous medium (e.g., sponge) or both. The glass thickness can be monitored in a manner similar to the method shown in FIG. 1 and used to control the heating profile of the projector 310. As shown in FIG. 3, a light source 308 projects light through a first lens 309 and to the glass 302. Reflected light is passed through a second lens 311 and onto CCD 312. The images recorded at the CCD are transmitted to a computer processor 313 where phase stepping measurements are used to calculate the fringe phase map as discussed above. The computer processor 313 is configured to independently control the heating profile, i.e. the electromagnetic radiation projected to each of the selected local regions, based on the fringe phase map. It is appreciated that the computer processor 313 may independently control a heating value of the electromagnetic radiation, such as the duration of the irradiation and the intensity of the radiation.

Figure 4:
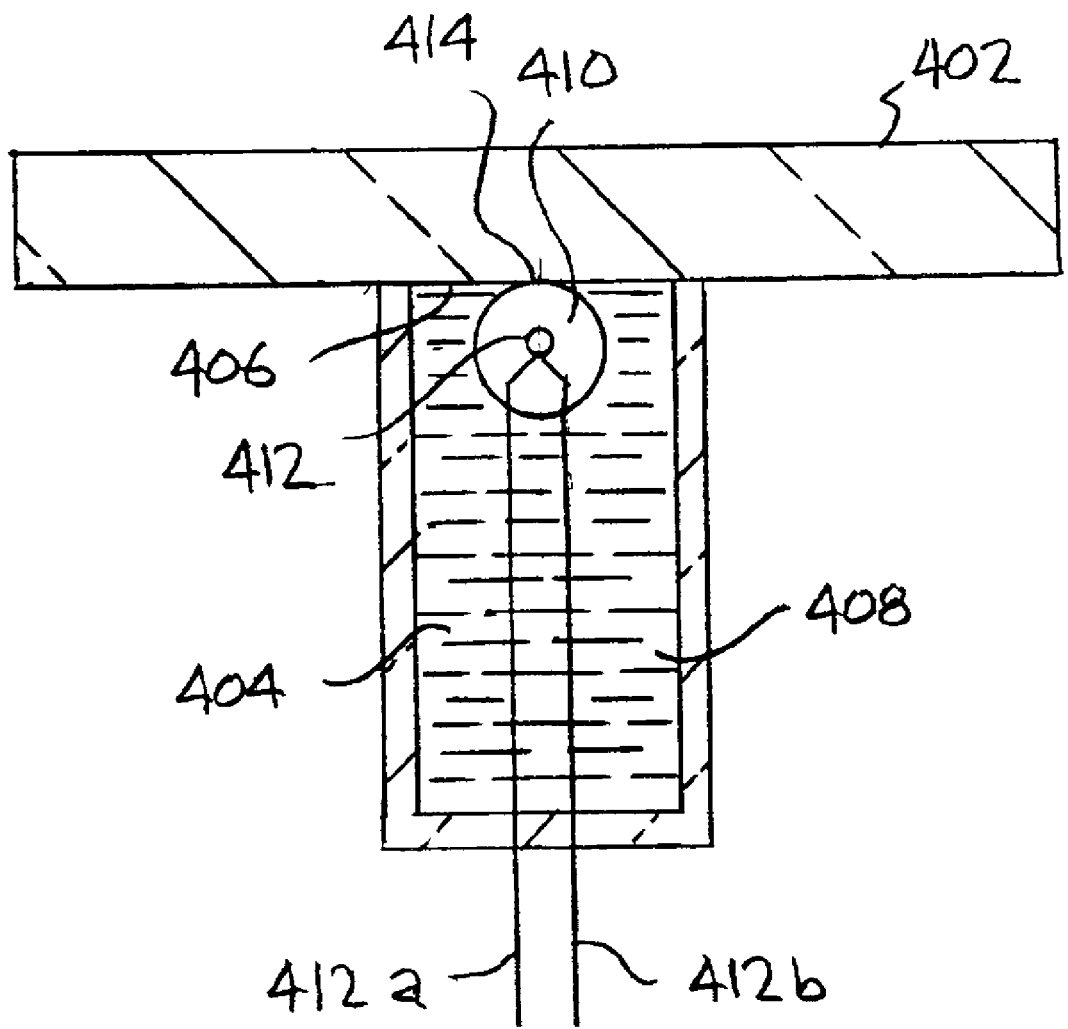
FIG. 4 is an elevation view of a fourth embodiment of the etching system and method illustrating local etching of a representative local region of a glass surface.

FIG. 4 is an elevation view of a fourth embodiment of the etching system and method using for the heater a reverse biased thermocouple described in pending application (Ser. No. 09/687,775) entitled "Surface Contouring by Controlled Application of Processing Fluid Using Marangoni Effect" to M. C. Rushford and J. A. Britten, the disclosure of which is incorporated herein by reference. Glass 402 is in contact with an etchant solution 404 at a dynamic liquid contact line 406. The acid 404 in the region 406 is surrounded by alcohol vapors produced by an alcohol liquid 410 during operation. A thermocouple 412 with reverse biasing is provided operating in the range of approximately 1 to approximately 10 volts and in the range of approximately 0.1 to approximately 10 amperes. In operation, the thermocouple 412 confines the heating spot 414 to the thermocouple junction and thereby provides local heating of the acid in the flow-starved acid between the thermocouple 412 and the glass 402, which increases the etching in this region. A RS thermocouple first wire 412a of the thermocouple 412 may be approximately 100% platinum insulated wire and a second wire 412b may be approximately 87% platinum and approximately 13% rhodium insulated wire. FIG. 4 also shows a representative single thermocouple operating to etch a representative local target region of the glass 402. It is appreciated, however, that the etching takes place in an imagewise manner in a parallel process. Imagewise etch processing is preferably achieved by providing an indexed array of thermocouples in a manner similar to FIG. 1A-B, for independent control and operation of each thermocouple.

The foregoing is illustrative of the present invention and is not to be construed as limiting thereof. The invention is defined by the following claims, with equivalents of the claims to be included therein

I claim:

1. A method of figuring a substrate surface comprising the steps of:

contacting the substrate surface with an etchant solution, wherein an etch rate of the etchant solution increases with temperature; and independently controlling the generation of a local thermal gradient in each of a plurality of selected local regions of a boundary layer of the etchant solution independent of other selected local regions, to imagewise etch the substrate surface in a parallel process.

2. The method as in claim 1, wherein the step of independently controlling the generation of a local thermal gradient in each selected local region comprises locally heating each selected local region independent of other selected local regions so that region-specific heating gradients are produced in the boundary layer, whereby the selected local regions etch the substrate surface at region-specific etch rates higher than non-selected local regions.

3. The method as in claim 2,
wherein a computer processor is provided to independently control the local heating of each selected local region.

4. The method as in claim 2,
further comprising the step of macro-cooling the etchant solution to prevent appreciable etching of the substrate surface not due to the local heating of the selected local regions.

5. The method as in claim 4,
wherein the etchant solution is macro-cooled to a null etch rate, whereby no etching takes place prior to the local heating of the selected local regions.

6. The method as in claim 4,
wherein the etchant solution is macro-cooled by fluid convection.

7. The method as in claim 2,
wherein the step of locally heating each selected local region independent of other selected local regions comprises projecting region-specific electromagnetic radiation towards the selected local regions of the boundary layer to simultaneously locally heat the selected local regions with region-specific heating gradients.

8. The method as in claim 7,
wherein a computer processor is provided to independently control the region-specific electromagnetic radiation projected towards each selected local region.

9. A method of figuring a substrate surface comprising the steps of:
contacting the substrate surface with an etchant solution, wherein an etch rate of the etchant solution increases with temperature;
activating a plurality of selected heaters corresponding to a plurality of selected local regions of a boundary layer of the etchant solution, and chosen from an indexed array of heaters each for locally heating a corresponding local region of the boundary layer upon selective activation thereof; and
independently controlling by a computer processor the activation of each selected heater, to produce region-specific heating gradients in the selected local regions of the boundary layer and thereby imagewise etch the substrate surface at region-specific etch rates in a parallel process.

10. The method as in claim 9,
wherein each heater of the indexed array comprises a pair of electrodes for, upon selective activation thereof, resistively heating a corresponding selected local region and producing a local ionic concentration gradient in the corresponding selected local region to locally etch the substrate surface.

11. The method as in claim 9,
further comprising the step of interferometrically monitoring the substrate surface to deterministically control the computer processor and the region-specific etch rates.

12. The method as in claim 11,
wherein the interferometrically monitoring step occurs concurrently with the figuring of the substrate surface.

13. The method as in claim 9,
further comprising the step of macro-cooling the etchant solution to prevent appreciable etching of the substrate surface not due to the local heating of the selected local regions.

14. The method as in claim 13,
wherein the etchant solution is macro-cooled to a null etch rate, whereby no etching takes place prior to the local heating of the selected local regions.

15. The method as in claim 13,
wherein the etchant solution is macro-cooled by fluid convection.

16. A method of figuring a substrate surface comprising the steps of:
contacting the substrate surface with an etchant solution, wherein an etch rate of the etchant solution increases with temperature;
projecting region-specific electromagnetic radiation towards selected local regions of a boundary layer of the etchant solution to simultaneously locally heat the selected local regions independent of other selected local regions; and
independently controlling by a computer processor the region-specific electromagnetic radiation projected towards each selected local region, to simultaneously produce region-specific heating gradients in the boundary layer and thereby imagewise etch the substrate surface at region-specific etch rates in a parallel process.

17. The method as in claim 16,
wherein the projected region-specific electromagnetic radiation is directed on a heatable material in conductive contact with the boundary layer of the etchant solution to thereby transfer heat to the selected local regions.

18. The method as in claim 16,
further comprising the step of macro-cooling the etchant solution to prevent appreciable etching of the substrate surface not due to the local heating of the selected local regions.

19. The method as in claim 18,
wherein the etchant solution is macro-cooled to a null etch rate, whereby no etching takes place prior to the local heating of the selected local regions.

20. The method as in claim 18,
wherein the etchant solution is macro-cooled by fluid convection.

21. A method of figuring a substrate surface comprising the steps of:
contacting the substrate surface with an etchant solution, wherein an etch rate of the etchant solution increases with temperature;
generating a local thermal gradient in each of a plurality of selected local regions of a boundary layer of the etchant solution to imagewise etch the substrate surface in a parallel process, wherein the step of generating a local thermal gradient in each selected local region comprises locally heating each selected local region, whereby the selected local regions etch the substrate surface at higher etch rates than non-selected local regions; and
using a computer processor to independently control the local heating of each selected local region to produce region-specific heating gradients in the boundary layer and thereby imagewise etch the substrate surface at region-specific etch rates; and
interferometrically monitoring the substrate surface to deterministically control the computer processor and the region-specific etch rates.

22. The method as in claim 21,
wherein the interferometrically monitoring step occurs concurrently with the figuring of the substrate surface.

23. A method of figuring a substrate surface comprising the steps of:

contacting the substrate surface with an etchant solution, wherein an etch rate of the etchant solution increases with temperature;

generating a local thermal gradient in each of a plurality of selected local regions of a boundary layer of the etchant solution to imagewise etch the substrate surface in a parallel process, wherein the step of generating a local thermal gradient in each selected local region comprises locally heating each selected local region by activating a plurality of selected heaters corresponding to the selected local regions and chosen from an indexed array of heaters each locally heating a corresponding local region of the boundary layer upon selective activation thereof, whereby the selected local regions etch the substrate surface at higher etch rates than non-selected local regions.

24. The method as in claim 23,
further comprising the step of independently controlling the activation of each selected heater to produce region-specific heating gradients in the boundary layer and thereby imagewise etch the substrate surface at region-specific etch rates.

25. The method as in claim 24,
wherein a computer processor is provided to independently control the activation of each selected heater.

26. The method as in 23,
wherein each heater of the indexed array comprises a pair of electrodes for, upon selective activation thereof, resistively heating a corresponding selected local region and producing a local ionic concentration gradient in the corresponding selected local region to locally etch the substrate surface.

27. A method of figuring a substrate surface comprising the steps of:

contacting the substrate surface with an etchant solution, wherein an etch rate of the etchant solution increases with temperature;

projecting electromagnetic radiation towards selected local regions of a boundary layer of the etchant solution to locally heat the selected local regions;

independently controlling by a computer processor the electromagnetic radiation projected towards each selected local region, to produce region-specific heating gradients in the boundary layer and thereby imagewise etch the substrate surface at region-specific etch rates in a parallel process; and interferometrically monitoring the substrate surface to deterministically control the computer processor and the region-specific etch rates.

28. The method as in claim 27,
wherein the interferometrically monitoring step occurs concurrently with the figuring of the substrate surface.

* * * * *

UNITED STATES PATENT AND TRADEMARK OFFICE
CERTIFICATE OF CORRECTION

PATENT NO. : 6,936,182 B1 Page 1 of 1
APPLICATION NO. : 10/087493
DATED : August 30, 2005
INVENTOR(S) : Michael C. Rushford and John S. Toeppen It is certified that error appears in the above-identified patent and that said Letters Patent is hereby corrected as shown below:

On the title page should read:

(75) Inventor: Michael C. Rushford, Livermore, CA (US)
          John S. Toeppen, Livermore, CA (US)

Signed and Sealed this

Fourteenth Day of November, 2006

JON W. DUDAS
*Director of the United States Patent and Trademark Office*